US009232557B2

(12) United States Patent
Laraqui et al.

(10) Patent No.: US 9,232,557 B2
(45) Date of Patent: Jan. 5, 2016

(54) 3GPP BASED CONTROL AND MANAGEMENT ARCHITECTURE FOR SMALL CELL BACKHAUL SOLUTIONS

(71) Applicant: TELEFONAKTIEBOLAGET L M ERICSSON (PUBL), Stockholm (SE)

(72) Inventors: Kim Laraqui, Solna (SE); Hans Mickelsson, Sollentuna (SE); Kåre Gustafsson, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 213 days.

(21) Appl. No.: 13/739,085

(22) Filed: Jan. 11, 2013

(65) Prior Publication Data

US 2014/0018083 A1 Jan. 16, 2014

Related U.S. Application Data

(60) Provisional application No. 61/669,733, filed on Jul. 10, 2012.

(51) Int. Cl.
*H04W 84/04* (2009.01)

(52) U.S. Cl.
CPC .......... *H04W 84/042* (2013.01); *H04W 84/045* (2013.01); *H04W 84/047* (2013.01)

(58) Field of Classification Search
USPC .................................................. 455/446, 450
See application file for complete search history.

(56) References Cited

U.S. PATENT DOCUMENTS

| | | | | |
|---|---|---|---|---|
| 8,761,100 | B2* | 6/2014 | Negus et al. .................. | 370/329 |
| 2011/0228673 | A1* | 9/2011 | Grayson et al. ............... | 370/232 |
| 2012/0302239 | A1* | 11/2012 | Hu et al. ........................ | 455/436 |
| 2013/0142166 | A1* | 6/2013 | Bogineni et al. .............. | 370/331 |

FOREIGN PATENT DOCUMENTS

EP 2 369 892 A1 9/2011

OTHER PUBLICATIONS

NGMN, Small cell backhaul requirements, by the NGMN (Next Generation Mobile Network) Alliance; Draft 0.16 Apr. 2012.
3GPP. $3^{rd}$ Generation Partnership Project; Technical Specification Group Radio Access Network; Evolved Universal Terrestrial Radio Access Network (E-UTRAN); S1 Application Protocol (S1AP) (Release 10). 3GPP TS 36.413 v10.6 0. Jun. 2012.
3GPP. 3rd Generation Partnership Project; Technical Specification Group Radio Access Network; Evolved Universal Terrestrial Radio Access Network (E-UTRAN); Architecture Description (Release 10). 3GPP TS 36.401 v10.4.0. Jun. 2012.
3GPP. 3rd Generation Partnership Project; Technical Spechication Group Services and System Aspects; Architecture enhancements for non-3GPP accesses (Release 11). 3GPP TS 23.402, v11.3.0. Jun. 2012.
3GPP. 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11). 3GPP TS 36 300 v11.2.0, Jun. 2012.
3GPP. 3rd Generation Partnership Project; Technical Specification Group Radio Access Network; Evolved Universal Terrestrial Radio Access (E-UTRA); Relay architectures for E-UTRA (LTE-Advanced) (Release 9). 3GPP TR 36.806 v9.0.0. Mar. 2010.

* cited by examiner

*Primary Examiner* — Jinsong Hu
*Assistant Examiner* — Jean Chang (57) ABSTRACT

A small cell backhaul network is described herein which is configured to interact with a 3GPP core and further configured to enable mobile broadband services to be provided to 3GPP mobile terminals. In addition, the small cell backhaul network's components namely a small cell radio base station, a small cell hub, a small cell backhaul controller, and a small cell backhaul storage unit are described herein.

19 Claims, 7 Drawing Sheets

3GPP BASED CONTROL AND MANAGEMENT ARCHITECTURE FOR SMALL CELL BACKHAUL SOLUTIONS

CLAIM OF PRIORITY

This application claims the benefit of U.S. Provisional Application Ser. No. 61/669,733 filed on Jul. 10, 2012. The contents of this document are hereby incorporated by reference herein.

TECHNICAL FIELD

The present invention relates to a small cell backhaul network which is configured to interact with a 3GPP core and further configured to enable mobile broadband services to be provided to 3GPP mobile terminals. In addition, the present invention relates to the small cell backhaul network's components namely a small cell radio base station, a small cell hub, a small cell backhaul controller, and a small cell backhaul storage unit.

BACKGROUND

The following abbreviations are herewith defined, at least some of which are referred to within the following description of the present invention.
3GPP Third Generation Partnership Project
AGCH Access Grant Channel
EC Emulated Core
EPC Enhanced Power Control
FDD Frequency Division Duplex
GTP GPRS Tunneling Protocol
HLR Home Location Register
HOP Higher Order Provisioning
HSPA High Speed Packet Access
HSS Home Subscriber Register
IE Information Element
IMS IP Multi-Media Subsystem
IMT International Mobile Telecommunication
LTE Long Term Evolution
MAC Medium Access Control
MBB Mobile Broadband
MBH Mobile Backhaul
MM Mobility Management
MME Mobility Management Entity
MPLS Multi-Protocol Lable Switching
MVNO Mobile Virtual Network Operator
MW Microwave
NAS Non-Access Stratum
NG Next Generation
NGMN Next Generation Mobile Networks
NLOS Non/Near Line of Sight
OSS Operations Support System
PDCP Packet Data Convergence Protocol
PDU Protocol Data Unit
QoS Quality of Service
RA Radio Access
RAN Radio Access Network
RBS Radio Base Station
RLC Radio Link Control
RRC Radio Resource Control
S1AP S1 Application Protocol
SCBH Small Cell Backhaul
SCTP Stream Control Transmission Protocol
SGw Service Gateway
SON Self-Organized Networking
TDD Time Division Duplex
UE User Entity/Equipment (Mobile Terminal)
UDP User Datagram Protocol
USIM User Subscriber Identity Module In the telecommunications field, small cell backhaul is playing a critical role in mobile broadband, and is rising in importance on account of the introduction of heterogeneous networks, sometimes referred to as hetnets. Basically, the small cell backhaul involves the deployment of numerous small cell radio base stations which complement the macrocell radio base stations. The deployment of small cell radio base stations requires a highly scalable and flexible small cell backhaul solution. The predominant approach used today to implement the small cell backhauling solution is to scale down the existing macro cell backhauling solution.

Figure 1:
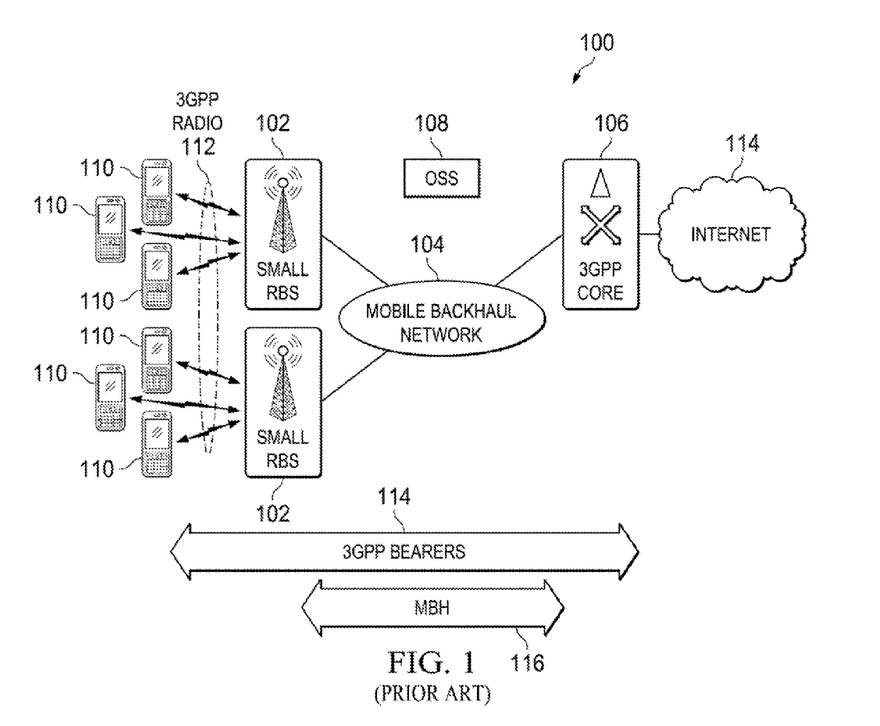
FIG. 1 (PRIOR ART) is a diagram of an exemplary wireless communication system which is used to describe the basic features of a traditional small cell backhauling solution.

Referring to FIG. 1 (PRIOR ART), there is a diagram of an exemplary wireless communication system 100 which shows the basic features of this predominant approach to implementing the small cell backhauling solution. In this approach, the small RBSs 102 are connected via a MBH network 104 to the 3GPP core 106. The MBH connectivity is normally pre-configured between the small RBSs 102 and the 3GPP core 106 utilizing an OSS 108 or some other network management solution. This MBH connectivity forms the basis over which Mobile Broadband (MBB) connectivity to the mobile terminals 110, over 3GPP air interfaces 112, can be set up dynamically.

In this approach, the 3GPP core 106 cooperates with the small RBSs 102 to establish 3GPP bearers 114 through which MBB data can flow between the mobile terminals 110 and e.g. the Internet 114. Portions of these 3GPP bearers 114 run through MBH connections 116, typically as tunnels across a packet network (e.g. GTP tunnels across an MPLS based network). In this situation, one can already observe a difference in control mechanisms of connectivity between the traditional MBH domain and the 3GPP domain:

The MBH connections 116 are semi-static and controlled by the OSS 108.

The 3GPP bearers 114 are dynamic and established by the 3GPP core 106 and the small RBSs 102 whenever 3GPP mobile terminals 110 request MBB resources.

As a result of this difference, there is an increasing interest in "pushing" the MBH connections 116 in a more dynamic on-demand direction, i.e. towards an approach that bears more resemblance to the MBB connectivity than to the traditional MBH connectivity. To this end, the operators and system vendors are looking at an alternative small cell backhaul solution which is described next with respect to FIG. 2 (PRIOR ART).

Figure 2:
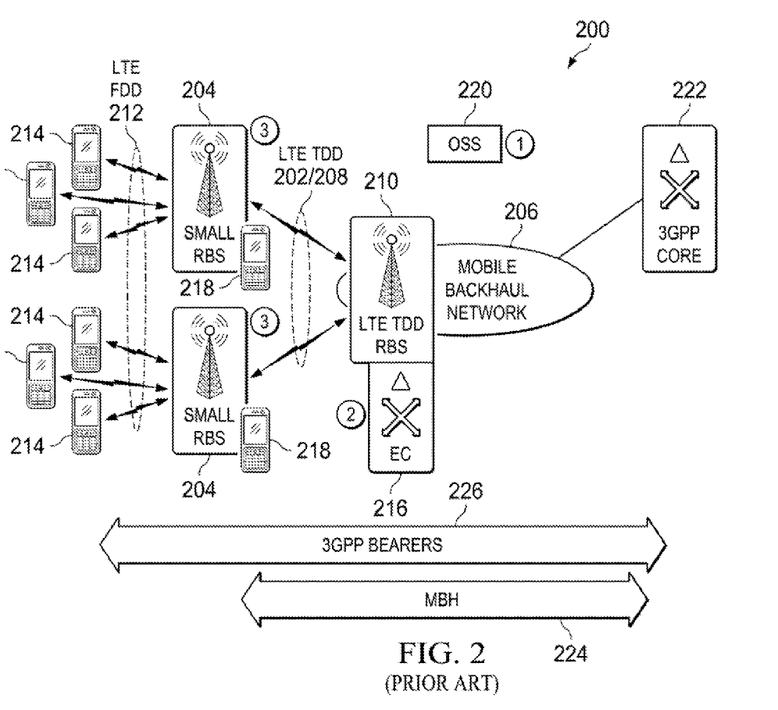
FIG. 2 (PRIOR ART) is a diagram of an exemplary wireless communication system which is used to describe the basic features of another traditional small cell backhauling solution.

Referring to FIG. 2 (PRIOR ART), there is a diagram of an exemplary wireless communication system 200 which shows the basic features of this alternative small cell backhaul solution. In this approach, a first MBH backhaul link 202 between the small RBSs 204 and the rest of the MBH network 206 (MBH cloud 206) is provided by a LTE TDD wireless link 208, in particular one supporting a hub-and-spoke structure. The LTE TDD wireless link 208 has spokes which end at the small RBSs 204. The LTE TDD wireless link 208 has a hub which ends at a LTE TDD RBS 210. Typically, the LTE TDD RBS 210 uses the LTE TDD wireless link 208 in the form of a NLOS point-to-multipoint radio link 208 to connect with the small RBSs 204. The small RBSs 204 provide LTE FDD links 212 to their respective mobile stations 214 (UEs 214).

The use of "LTE" in the backhaul, e.g. LTE TDD 208 as in this example, means that the establishment of this connectivity must be secured, and this requires an LTE (3GPP) core. In the current solutions pursued in various trials and announcements, this LTE 3GPP core 216 is emulated in the node type previously referred to herein as the LTE TDD RBS 210. Plus, the first MBH backhaul link 202 (e.g., LTE TDD backhaul hop 202) can be implemented by placing a LTE TDD UE equivalent 218 on each of the original LTE FDD RBSs 204, which then cooperate with the LTE TDD RBS 210 and in particular the emulated LTE 3GPP core entity 216 (e.g., emulated core 216) to establish the first MBH backhaul link 202. A step-by-step discussion is provided next to explain how the connectivity between the mobile stations 214 and the 3GPP core 222 can be established per this small cell backhaul solution. The steps are as follows:

1. The MBH OSS 220 establishes connectivity between the 3GPP core 222 and the LTE TDD RBS 210.
2. The LTE TDD RBS's emulated core 216 provides the necessary 3GPP core functions so that the LTE TDD wireless link 208 is established between the LTE TDD RBS 210 and the small RBSs 204. Now, the small RBSs 204 have full MBH connectivity to the 3GPP core 222.
   a. The MBH connectivity for the small RBSs 204's cells therefore is the combination of MBH 224 and the LTE TDD wireless link 208.
3. The small RBSs 204 now utilizes 3GPP signaling to interface with the 3GPP core 222 and establish the 3GPP radio bearers 226 for MBB services to their respective mobile stations 214.

Figure 3:
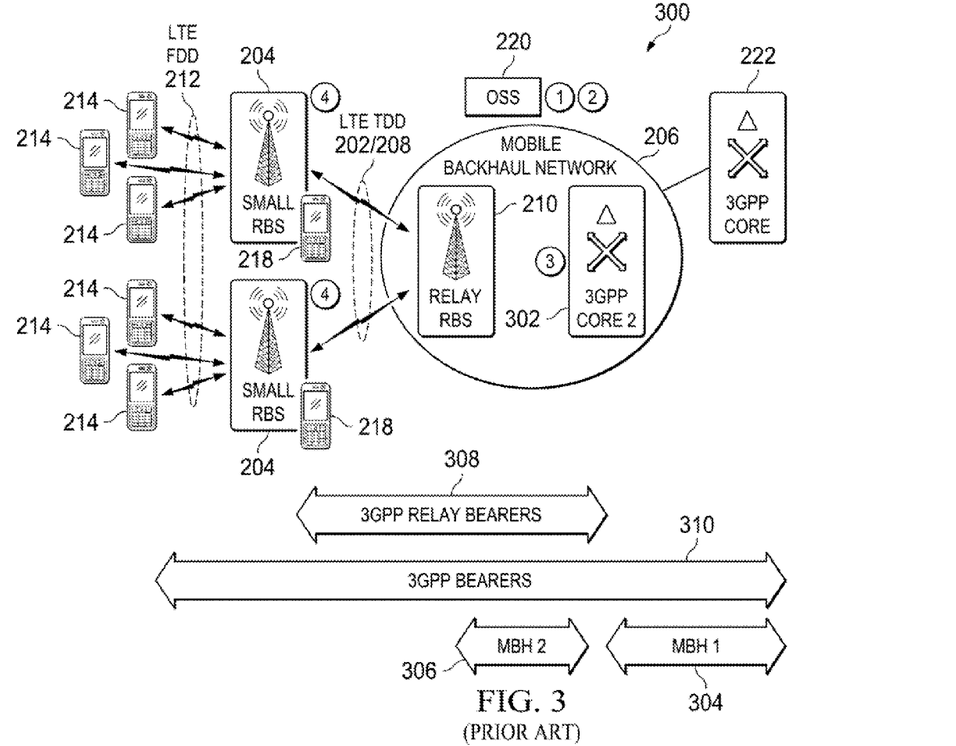
FIG. 3 (PRIOR ART) is a diagram of an exemplary wireless communication system which is used to describe the basic features of yet another traditional small cell backhauling solution.

Referring to FIG. 3 (PRIOR ART), there is a diagram of an exemplary wireless communication system 300 which shows the basic features of yet another alternative small cell backhaul solution which has a set-up similar to FIG. 2's solution except that the LTE TDD RBS 210 no longer has the emulated core 216 located therein but instead there is a separate 3GPP core 302 (shown as 3GPP core 2) which is located in the MBH network 206 (MBH cloud 206). This particular solution is discussed in 3GPP TR 36.806 "Relay Architectures for E-UTRA (LTE-Advanced)" V.9.0.0, March 2010 (the contents of which are incorporated by reference herein). A step-by-step discussion is provided next to explain how the connectivity between the mobile stations 214 and the 3GPP core 222 can be established per this small cell backhaul solution.

1. The OSS 220 establishes the MBH connection 304 ("MBH 1") between the 3GPP cores 222 and 302.
2. The OSS 220 also establishes another leg 306 ("MBH 2") of the MBH connection between the 3GPP core 302 and the LTE TDD RBS 210.
3. The 3GPP core 302 is used to control small cell backhaul bearers 308 ("3GPP Relay Bearers") and establish the connection to the small RBSs 204.
   a. The MBH connection of the small RBSs 204 is therefore the combination of small cell backhaul bearers 308 (partly carried over MBH 2) and MBH 1.
4. The small RBSs 204 now have connectivity all the way to the 3GPP core 222 to establish 3GPP bearers 310 for MBB services to their respective mobile stations 214.

Although these small cell backhaul solutions work well in most applications there is still a desire to improve upon them to provide a more flexible small cell backhaul solution. One such new and improved small cell backhaul solution is the subject of the present invention.

SUMMARY

A small cell backhaul network which is an improvement upon the traditional small cell backhaul networks is described in an independent claim of the present application. In addition, the small cell backhaul network's components namely a small cell radio base station, a small cell hub, a small cell backhaul controller, a small cell backhaul storage unit and their associated methods are also described in independent claims of the present application. Advantageous embodiments of small cell backhaul network including the small cell backhaul network's components namely the small cell radio base station, the small cell hub, the small cell backhaul controller, the small cell backhaul storage unit and their associated methods have been described in the dependent claims of the present application.

In one aspect, the present invention provides a small cell backhaul network which is configured to interact with a 3GPP core and further configured to enable mobile broadband services to be provided by the 3GPP core to 3GPP mobile terminals. The small cell backhaul network comprises multiple small cell radio base stations, a small cell hub, a small cell backhaul controller, and a small cell backhaul storage unit. Each small cell radio base station is linked to respective 3GPP mobile terminals. The small cell hub provides at least one wireless link to the plurality of small cell radio base stations. The at least one wireless link is emulated as 3GPP radio bearers as seen from the 3GPP core irrespective of radio technology actually used to implement the at least one wireless link. The small cell backhaul controller controls the at least one wireless link between the small cell hub and the small cell radio base stations. The small cell backhaul controller interacts with both the small cell hub and the 3GPP core. The small cell backhaul storage unit maintains data pertaining to the at least one wireless link between the small cell hub and the small cell radio base stations. The small cell backhaul storage unit is coupled to the small cell backhaul controller. An advantage of the small cell backhaul network is that it effectively "reuses" 3GPP technology to manage a large number of dynamic small cell links.

In another aspect, the present invention provides a small cell radio base station (and a method implemented by same) which enables mobile broadband services to be provided to 3GPP mobile terminals. The small cell radio base station comprises a processor and a memory which stores processor-executable instructions where the processor interfaces with the memory and executes the processor-executable instructions to enable the following operations: (a) providing a link (e.g., LTE FDD link) to the 3GPP mobile terminals; and (b) interfacing with a small cell hub via a wireless link. The wireless link is emulated as 3GPP radio bearers as seen from a 3GPP core irrespective of a radio technology (e.g., NLOS in non-IMT bands, WiFi) actually used to implement the wireless link. Plus, the small cell radio base station is emulated as a legacy user equipment as seen from the 3GPP core. An advantage of the small cell radio base station is that it effectively "reuses" 3GPP technology to manage a large number of dynamic small cell links.

In another aspect, the present invention provides a small cell hub (and a method implemented by same) which enables mobile broadband services to be provided to 3GPP mobile terminals. The small cell hub comprises a processor and a memory which stores processor-executable instructions where the processor interfaces with the memory and executes the processor-executable instructions to enable the following operation: (a) providing at least one wireless link to the small radio base stations. The at least one to wireless link is emulated as 3GPP radio bearers as seen from the 3GPP core irrespective of a radio technology (e.g., NLOS in non-IMT bands, WiFi) actually used to implement the at least one wireless link. Plus, the small cell hub is emulated as a legacy radio base station as seen from the 3GPP core. An advantage of the small cell hub is that it effectively "reuses" 3GPP technology to manage a large number of dynamic small cell links.

In another aspect, the present invention provides a small cell backhaul controller (and a method implemented by same) which enables mobile broadband services to be provided to 3GPP mobile terminals. The small cell backhaul controller comprises a processor and a memory which stores processor-executable instructions where the processor interfaces with the memory and executes the processor-executable instructions to enable the following operation: (a) controlling at least one wireless link between the small cell hub and the small cell radio base stations. The at least one wireless link is emulated as 3GPP radio bearers as seen from the 3GPP core irrespective of a radio technology (e.g., NLOS in non-IMT bands, WiFi) actually used to implement the at least one wireless link. An advantage of the small cell hub is that it effectively "reuses" 3GPP technology to manage a large number of dynamic small cell links.

In another aspect, the present invention provides a small cell backhaul storage unit (and a method implemented by same) which enables mobile broadband services to be provided to 3GPP mobile terminals. The small cell backhaul storage unit comprises a processor and a memory which stores processor-executable instructions where the processor interfaces with the memory and executes the processor-executable instructions to enable the following operation: (a) maintaining data pertaining to at least one wireless link between a small cell hub and small cell radio base stations. The at least one wireless link is emulated as 3GPP radio bearers as seen from the 3GPP core irrespective of a radio technology (e.g., NLOS in non-IMT bands, WiFi) actually used to implement the at least one wireless link. An advantage of the small cell backhaul storage unit is that it effectively "reuses" 3GPP technology to manage a large number of dynamic small cell links.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings.

DETAILED DESCRIPTION

Figure 4:
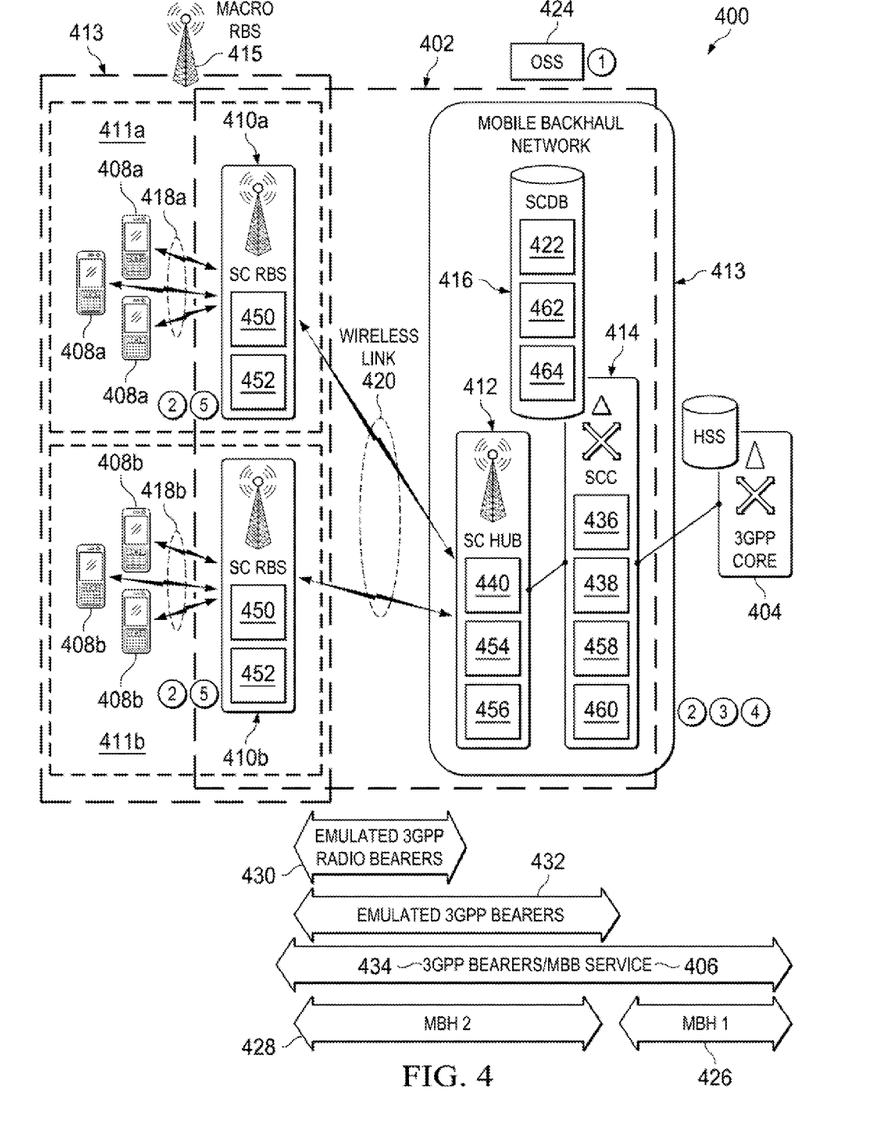
FIG. 4 is a diagram of an exemplary wireless communication system which incorporates a small cell backhauling network configured in accordance with an embodiment of the present invention.

Referring to FIG. 4, there is a diagram of an exemplary wireless communication system 400 which incorporates a small cell backhauling network 402 configured in accordance with an embodiment of the present invention. The small cell backhaul network 402 is configured to interact with a 3GPP core 404 and further configured to enable mobile broadband services 406 to be provided by the 3GPP core 404 to 3GPP mobile terminals 408a and 408b (e.g., UEs, mobile phones, smart phones, laptops, personal digital assistants). As shown, the small cell backhaul network 402 comprises multiple small cell radio base stations 410a and 410b (only two shown), a small cell hub 412, a small cell backhaul controller 414, and a small cell backhaul storage unit 416. The small cell radio base station 410a and 410b provide LTE FDD (or other 3GPP) wireless links 418a and 418b to their respective 3GPP mobile terminals 408a and 408b. The small cell hub 412 provides at least one wireless link 420 to the small cell radio base stations 410a and 410b. The small cell backhaul controller 414 interacts with both the small cell hub 412 and the 3GPP core 404. In particular, the small cell backhaul controller 414 controls the at least one wireless link 420 between the small cell hub 412 and the small cell radio base stations 410a and 410b. The small cell hub 412 and the small cell backhaul controller 414 are located in a mobile backhaul network 413. The small cell backhaul storage unit 416 maintains data 422 pertaining to the at least one wireless link 420 between the small cell hub 412 and the small cell radio base stations 410a and 410b. A detailed discussion about each of the components 410a, 410b, 412, 414, and 416 is provided below after a step-by-step discussion is provided to explain how the connectivity between the 3GPP mobile terminals 408a and 408b and the 3GPP core 404 can be established by this new and improved small cell backhaul network 402.

1. The OSS 424 establishes a MBH connection 426 ("MBH 1") between the 3GPP core 404 and the small cell backhaul controller 414. This would be done prior to the deployment of small cell radio base stations 410a and 410b.

2. The small cell backhaul controller 414 and the small cell radio base stations 410a and 410b establish another leg 428 ("MBH 2") without the intervention of the OSS 424 (note: the OSS 424 could alternatively establish leg 428 ("MBH 2") only if the OSS 424 is used to control the at least one wireless link 420). Each small cell radio base station 410a and 410b provides coverage for a respective small cell 411a and 411b that has an area which is smaller than a macro 3GPP cell 413. A macro radio base station 415 provides the coverage for the macro 3GPP cell 413 which covers an area that typically overlaps the coverage areas of the small cells 411a and 411b.

3-4. The small cell backhaul controller 414 which emulates the control parts of a 3GPP core (e.g. MME) establishes emulated 3GPP radio bearers 430 (between the small cell hub 412 and the small cell radio base stations 410a and 410b) and establishes emulated 3GPP bearers 432 (between the small cell backhaul controller 414 and the small cell radio base stations 4100a and 410b). This is done in cooperation with the small cell radio base stations 410a and 410b which emulate 3GPP UE behavior. It should be noted that the small cell backhaul controller 414 is a 3GPP core instance which could be implemented in a separate new node or in an existing node such as the 3GPP core 404. These steps are a marked-improvement over the prior art small cell backhaul solutions and a more detailed description about how the small cell backhaul network 402 is configured to enable steps 3-4 is provided below.

5. The small cell radio base stations 410a and 410b now have connectivity all the way to the 3GPP core 404 to establish 3GPP bearers 434 for the MBB services 406 to their respective 3GPP mobile terminals 408a and 408b.

It should be noted that the at least one wireless link 420 which is over an air interface can be implemented as a point-to-multipoint wireless link (as discussed in the specification hereinafter), at least one point-to-point wireless link, a combination of point-to-multipoint wireless link and least one point-to-point wireless link, a Non/Near Line of Sight (NLOS) in Non-International Mobile Telecommunication (IMT) bands, or a WiFi but the at least one wireless link 420 is emulated as a point-to-multipoint wireless link as seen from the 3GPP core. In other words, the actual wireless link 420 (air interface) between the small cell hub 412 and the small cell radio base stations 410a and 410b could be based on some point-to-point technology, but from a backhauling perspective the small cell hub 412 itself acts as its name implies, i.e. a point to which multiple small cell radio base stations 410a and 410b are connected for the purpose of connecting those to the rest of the wireless/mobile system (e.g., 3GPP core 404).

The small cell backhaul network's components namely the small cell radio base stations 410a and 410b, the small cell hub 412, the small cell backhaul controller 414, and the small cell backhaul storage unit 416 have features-functionalities as follows:

1. The small cell radio base stations 410a and 410b are each linked to the rest of the network via the point-to-multipoint wireless link 420.
   1.1. From the perspective of the 3GPP core 404, each small cell radio base station 410a and 410b is modeled as a regular 3GPP UE.
   1.2. The 3GPP NAS parts of each small cell radio base station 410a and 410b need not be implemented in the base station 410a and 410b itself, but can be emulated in the small cell hub 412. As discussed below, this feature is particularly advantageous in case of the legacy radio bearers which cannot be amended with a NAS for various reasons.
   Note: the air interface between the small cell hub 412 and the small cell radio base stations 410a and 410b connected to it could be based on a point-to-point radio air technology, since even in that case the small cell hub 412 still acts as a point where multiple small cell radio bases stations 410a and 410b are connected to the rest of the network namely the 3GPP core 404. As discussed above, the 3GPP core 404 from a backhauling topology perspective interprets this wireless link 420 (air interface) as a point-to-multipoint wireless link.

2. The small cell hub 412 forms the aggregation point and link between the small cell radio base stations 410a and 410b and the rest of the mobile network.
   2.1. From the perspective of the 3GPP core 404, the small cell hub 412 is modeled as a regular radio base station.
   2.2. The small cell hub 412 may emulate parts of the 3GPP behavior (e.g., NAS) normally expected to be implemented on the small cell radio base stations 410a and 410b (which are modeled as 3GPP UEs from the perspective of the 3GPP core 404). For example, the small cell hub 412 comprises a NAS bridge 440 which hides from the small cell radio base stations 410a and 410b at least a portion of NAS signaling which is originated from the small cell backhaul controller 414 (see FIG. 5). In particular, the NAS bridge 440 can emulate a NAS UE entity towards the small cell backhaul controller 414. Plus, the NAS bridge 440 is configured to originate and terminate NAS PDU IEs.

3. The point-to-multipoint wireless link 420 connects the small cell radio base stations 410a and 410b to the small cell hub 412.
   3.1. From the perspective of the 3GPP core 404, the point-to-multipoint wireless link 420 is emulated as 3GPP radio bearers (regular LTE radio bearers) irrespective of a radio technology actually used to implement the point-to-multipoint wireless link 420. For example, the other radio technology that can be used to implement this link includes NLOS in IMT bands, and WiFi etc. . . . .
      3.1.1. The manner in which the small cell radio base station 410a and 410b and the small cell hub 412 discover, relate and connect to one another is parallel to the manner in which a 3GPP UE and a corresponding 3GPP radio base station, respectively, discover, relate and connect to one another. For example, a 3GPP cell re-selection corresponds to the small cell radio base station 410a and 410b changing its connectivity from one small cell hub 412 to another small cell hub (not shown).
      3.1.2. Parts of the LTE baseband and 3GPP lower protocol stacks (e.g. PDCP, RLC, MAC, RRC) might be reused in the small cell radio base stations 410a and 410b and the small cell hub 412 to control the point-to-multipoint wireless link 420. Alternatively, the control and/or data-plane protocols can be non-3GPP.

4. The small cell backhaul controller 414 controls the point-to-multipoint wireless link 420 by means of interactions with the small cell radio base stations 410a and 410b and the small cell hub 412.

4.1. The small cell backhaul controller 414 contains a data plane entity 436 (user plane entity 436) and a control plane entity 438. The small cell backhaul controller 414 is implemented using 3GPP core network technologies such as, e.g. MME, SGw etc. As with the 3GPP technologies, the small cell backhaul controller's data plane and control plane entities 436 and 438 do not need to be located on the same physical node.

4.2. The small cell backhaul controller 414 can employ the S1AP standard (S1 Application Protocol (S1AP), 3GPP 36.413, V10.6.0, June 2012—the contents of which are incorporated by reference herein) in the control plane interactions with the small cell hub 412, and in controlling resources (radio bearers) associated with the point-to-multipoint wireless link 420.

4.3. Similarly, the small cell backhaul controller 414 can employ standard NAS signaling to interact with the small cell radio base stations 410a and 410b in the control plane.

4.3.1. This does not exclude adaptation of existing 3GPP NAS, or the definition of any new NAS, for the purpose of handling non-IMT radio bearers.

4.3.2. The termination of NAS signaling may be on the small cell hub 412 itself (see explanation in item 2.2).

4.4. The small cell backhaul controller 414 and the small cell backhaul storage unit 416 can be implemented as a MVNO entity, in an existing 3GPP Core network (see FIG. 10).

5. The small cell backhaul storage unit 416 contains provisioning and other data 422 pertaining to the small cell radio base stations 410a and 410b and the characteristics (e.g., QoS, bandwidth and others) of the point-to-multipoint wireless link 420 which the small cell radio base stations 410a and 410b utilize with the small cell hub 412.

5.1. The small cell backhaul storage unit 416 is implemented using 3GPP core network technologies, e.g. HSS, HLR.

5.1.1. Hence, in the small cell backhaul storage unit 416, the small cell radio base stations 410a and 410b are modeled as regular 3GPP UEs.

Figure 5:
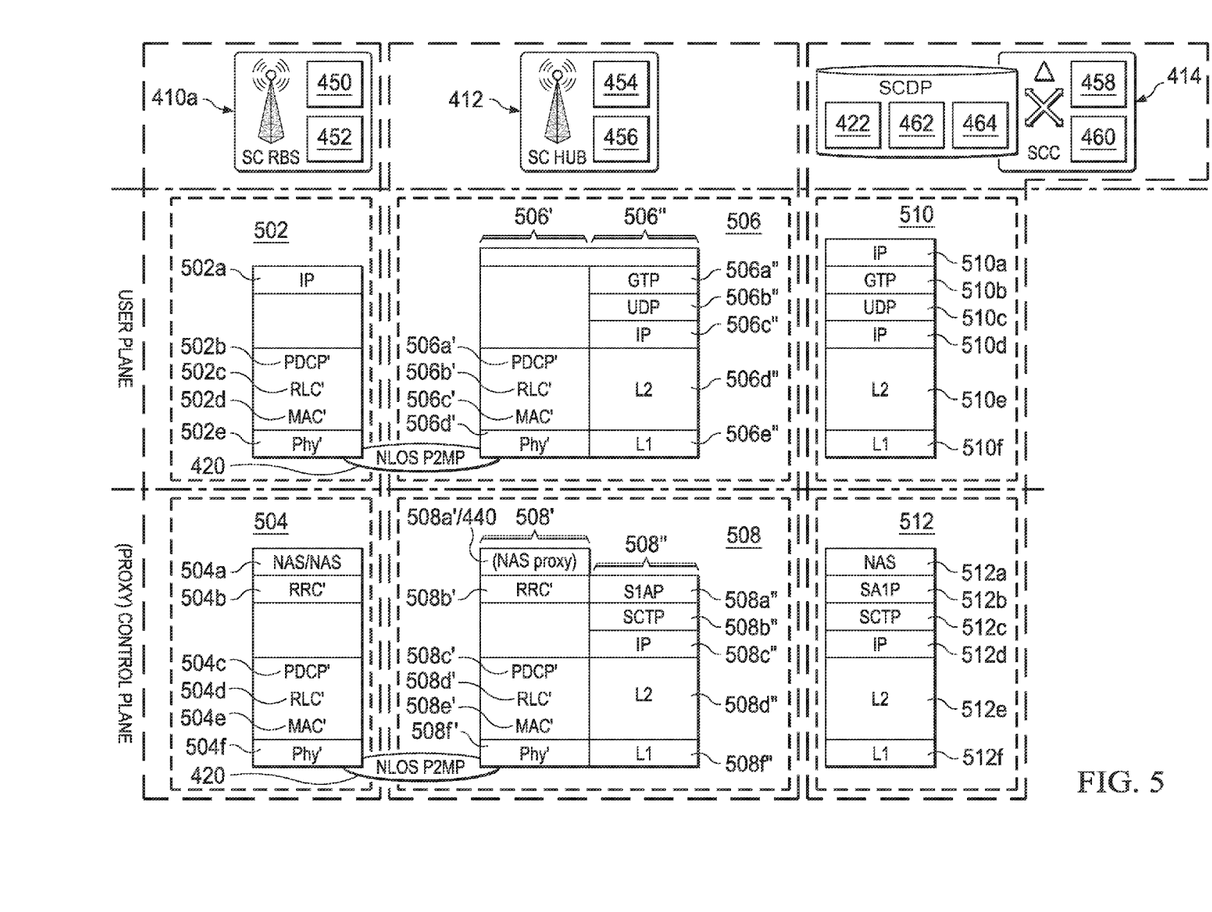
FIG. 5 is a diagram illustrating exemplary protocol stacks associated with the small cell backhauling network's components namely a small cell radio base station, a small cell hub and a small cell backhaul controller shown in FIG. 4 in accordance with an embodiment of the present invention.

Referring to FIG. 5, there is a diagram illustrating an example of the small cell radio base station's user plane protocol stack 502 and control plane protocol stack 504, the small cell hub's user plane protocol stack 506 and control plane protocol stack 508, and the small cell backhaul controller's user plane protocol stack 510 and control plane protocol stack 512 in accordance with an embodiment of the present invention. In this example, the 1 to small cell radio base station 410a which is implementing the UE side of the point-to-multipoint wireless link 420 (e.g., NLOS P2MP link 420) is shown utilizing various protocol options marked as PDCP', RLC', MAC' and Phy'. In particular, the small cell radio base station 410a is shown incorporating the user plane protocol stack 502 which comprises an IP layer 502a, a PDCP layer 502b, a RLC layer 502c, a MAC layer 502d, and a Physical layer 502e. Further, the small cell radio base station 410a/410b incorporates a control plane protocol stack 504 including a NAS layer 504a, a RRC layer 504b, a PDCP layer 504c, a RLC layer 504d, a MAC layer 504e, and a Physical layer 504f. The small cell radio base station 410b (and other small cell radio base stations) would also incorporate the same user plane protocol stack 502 and the same control plane protocol stack 504.

In this example, the small cell hub 412 incorporates the user plane protocol stack 506 which has a portion 506' that interfaces with the small cell radio base stations 410a and 410b's user plane protocol stack 502 and comprises a PDCP layer 506a', a RLC layer 506b', a MAC layer 506c', and a Physical layer 506d'. The small cell hub 412's user plane protocol stack 506 has another portion 506" which interfaces with the small cell backhaul controller 414's user plane protocol stack 510 and comprises a GTP layer 506a", a UDP layer 506b", an IP layer 506c", a L2 layer 506d", and a L1 layer 506e". Furthermore, the small cell hub 412 incorporates the control plane protocol stack 508 which has a portion 508' which interfaces with the small cell radio base stations 410a and 410b's control plane protocol stack 504 and comprises a NAS proxy layer 508a', a RRC layer 508b', a PDCP layer 508c', a RLC layer 508d', a MAC layer 508e', and a Physical layer 508f'. The small cell hub 412's control plane protocol stack 508 has another portion 508" which interfaces with the small cell backhaul controller 414's control plane protocol stack 512 and comprises a S1AP layer 508a", a SCTP layer 508b", an IP layer 508c", a L2 layer 508d", and a L1 layer 508e". The point-to-multipoint wireless link 420 (e.g., NLOS P2MP 420) is formed between the small cell radio base stations 410a and 410b's Physical layers 502e and 504f and the small cell hub 412's Physical layers 506d' and 508f'. Alternatively, the small cell radio base stations 410a and 410b and the small cell hub 412 if desired can implement their own versions of protocols corresponding to the marked PDCP', RLC', MAC', Phy' etc. . . . .

The small cell backhaul controller 414 incorporates the user plane protocol stack 510 which interfaces with the small cell hub 412's user plane protocol stack 506 and comprises a first IP layer 510a, a GTP layer 510b, a UDP layer 510c, a second IP layer 510d, a L2 layer 510e, and a L1 layer 510f. Further, the small cell backhaul controller 414 incorporates the control plane protocol stack 512 which interfaces with the small cell hub 412's control plane protocol stack 508 and comprises a NAS layer 512a, a S1AP layer 512b, a SCTP layer 512c, an IP layer 512d, a L2 layer 512e, and a L1 layer 512f.

As can be seen in FIG. 5, the NAS role is emulated by the control plane entity 508 of the small cell hub 412 which acts as the NAS bridge 440 with the following functionality:

The NAS bridge 440 emulates a NAS UE entity towards the core of the network, i.e. towards the small cell backhaul controller 414.

The NAS bridge 440 hides, to the small cell radio base stations 410a and 410b, all or parts of NAS signaling normally occurring between 3GPP IUE and 3GPP MME. Recall: each small cell radio base station 410a and 410b is modeled as a regular 3GPP UE from the perspective of the 3GPP core 404. Plus, the small cell backhaul controller 414 can be implemented using 3GPP MME technology.

The NAS bridge 440 originates and terminates e.g. NAS PDU IEs that are normally used in 3GPP for message exchanges between the 3GPP MME and the 3GPP UE.

Based on what the small cell hub 412 knows or finds out regarding the capabilities of the small cell radio base stations 410a and 410b, it can activate the NAS bridge 440's function for those particular small cell radio base stations 410a and 410b and the point-to-multipoint wireless link 420 between the small cell radio base stations 410a and 410b and the small cell hub 412.

Figure 6:
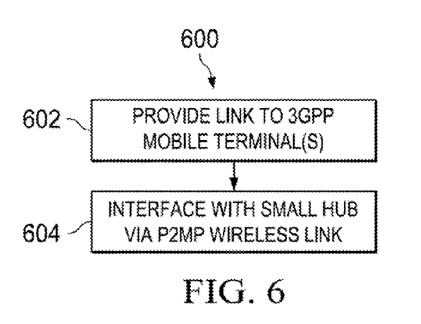
FIG. 6 is a flowchart which illustrates exemplary steps of a small cell backhaul solution method which are performed by the small cell radio base station in accordance with an embodiment of the present invention.

Referring to FIG. 6, there is a flowchart which illustrates exemplary steps of a small cell backhaul solution method 600 which are performed by the small cell radio base station 410a (for example) in accordance with an embodiment of the present invention. The small cell radio base station 410a comprises a processor 450 and a memory 452 which stores processor-executable instructions where the processor 450 interfaces with the memory 452 and executes the processor-executable instructions to enable the following operations: (a) providing the link 418*a* (LTE FDD link 418*a*) to the 3GPP mobile terminals 408*a* (step 602); and (b) interfacing with the small cell hub 412 via the point-to-multipoint wireless link 420 (step 604). Recall: the point-to-multipoint wireless link 420 is emulated as 3GPP radio bearers as seen from the 3GPP core 404 irrespective of a radio technology (e.g., NLOS in IMT bands, WiFi) actually used to implement the point-to-multipoint wireless link 420. Plus, the small cell radio base station 410*a* is emulated as a legacy user equipment as seen from the 3GPP core 404.

Figure 7:
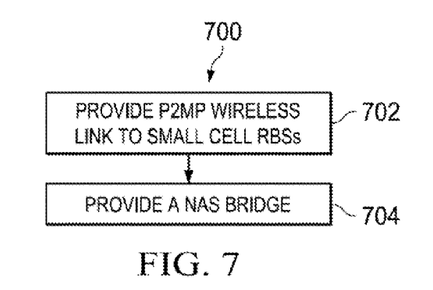
FIG. 7 is a flowchart which illustrates an exemplary step of a small cell backhaul solution method which is performed by the small cell hub in accordance with an embodiment of the present invention.

Referring to FIG. 7, there is a flowchart which illustrates the exemplary step of a small cell backhaul solution method 700 which is performed by the small cell hub 412 in accordance with an embodiment of the present invention. The small cell hub 412 comprises a processor 454 and a memory 456 which stores processor-executable instructions where the processor 454 interfaces with the memory 456 and executes the processor-executable instructions to enable the following operation: (a) providing the point-to-multipoint wireless link 420 to the small radio base stations 410*a* and 410*b* (step 702). Recall: the point-to-multipoint wireless link 420 is emulated as 3GPP radio bearers as seen from the 3GPP core 404 irrespective of a radio technology (e.g., NLOS in IMT bands, WiFi) actually used to implement the point-to-multipoint wireless link 420. Plus, the small cell hub 412 is emulated as a legacy radio base station as seen from the 3GPP core 404.

Figure 8:
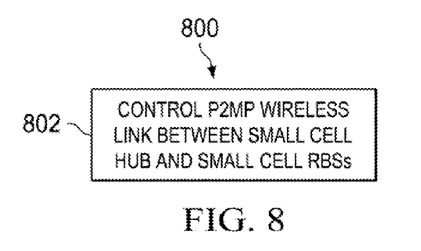
FIG. 8 is a flowchart which illustrates the exemplary step of a small cell backhaul solution method which is performed by the small cell backhaul controller in accordance with an embodiment of the present invention.

Referring to FIG. 8, there is a flowchart which illustrates the exemplary step of a small cell backhaul solution method 800 which is performed by the small cell backhaul controller 414 in accordance with an embodiment of the present invention. The small cell backhaul controller 414 comprises a processor 458 and a memory 460 which stores processor-executable instructions where the processor 458 interfaces with the memory 460 and executes the processor-executable instructions to enable the following operation: (a) controlling the point-to-multipoint wireless link 420 between the small cell hub 412 and the small cell radio base stations 410*a* and 410*b* (step 802). Recall: the point-to-multipoint wireless link 420 is emulated as 3GPP radio bearers as seen from the 3GPP core 404 irrespective of a radio technology (e.g., NLOS in IMT bands, WiFi) actually used to implement the point-to-multipoint wireless link 420.

Figure 9:
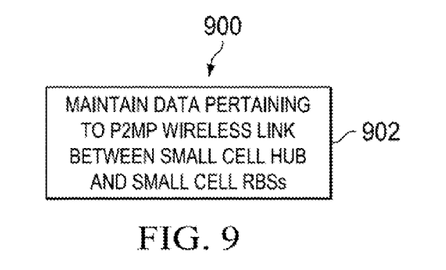
FIG. 9 is a flowchart which illustrates the exemplary step of a small cell backhaul solution method which is performed by the small cell backhaul storage unit in accordance with an embodiment of the present invention.

Referring to FIG. 9, there is a flowchart which illustrates the exemplary step of a small cell backhaul solution method 900 which is performed by the small cell backhaul storage unit 416 in accordance with an embodiment of the present invention. The small cell backhaul storage unit 416 comprises a processor 462 and a memory 464 which stores processor-executable instructions where the processor 462 interfaces with the memory 464 and executes the processor-executable instructions to enable the following operation: (a) maintaining the data 422 pertaining to the point-to-multipoint wireless link 420 between the small cell hub 412 and the small cell radio base stations 410*a* and 410*b* (step 902). Recall: the point-to-multipoint wireless link 420 is emulated as 3GPP radio bearers as seen from the 3GPP core 404 irrespective of a radio technology (e.g., NLOS in IMT bands, WiFi) actually used to implement the point-to-multipoint wireless link 420.

Figure 10:
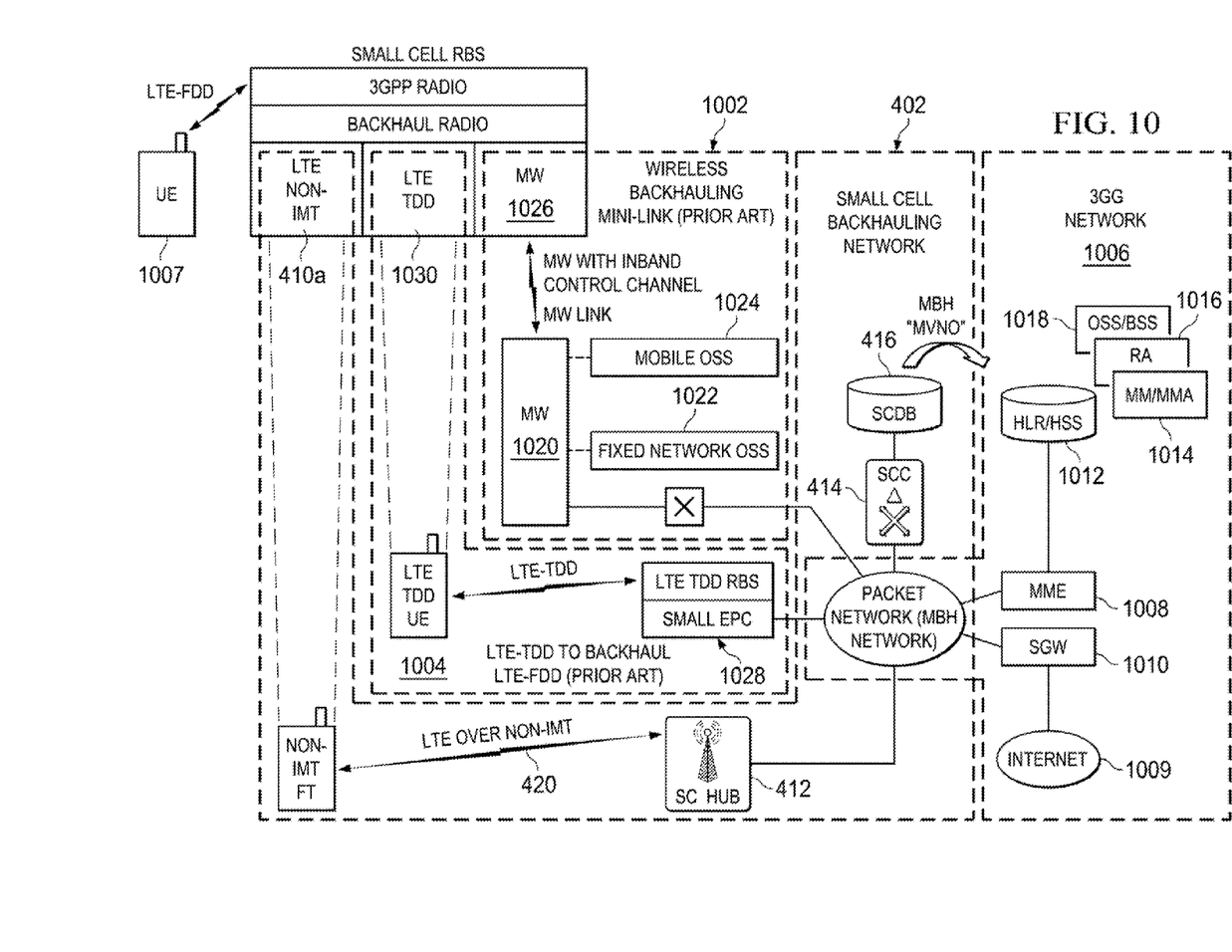
FIG. 10 is a basic diagram illustrating a small cell backhaul control architecture which compares two prior art small cell backhaul solutions and the new small cell backhauling network all of which interface with a 3GPP core network to enable a 3GPP mobile terminal to interface with the Internet.

Referring to FIG. 10, there is a basic diagram illustrating a small cell backhaul control architecture which compares two prior art small cell backhaul solutions 1002 and 1004 and the new small cell backhauling network 402 all of which interface with a 3GPP core network 1006 to enable a 3GPP mobile terminal 1007 (one shown) to interface with the Internet 1009. As shown, the 3GPP core network 1006 includes a MME 1008, a SGW 1010, an HLR/HSS 1012, a MM/MMA 1014, a RA 1016, and an OSS/BSS 1018—one skilled in the art will appreciate that the 3GPP core network 1006 would also include other well known components. The first prior art small cell backhaul solution 1002 includes a MW 1020, a fixed network OSS 1022, a mobile OSS 1024, and a small cell radio base station's MW 1026—one skilled in the art will readily recognize this architecture. The second prior small cell backhaul solution 1004 includes a LTE TDD RBS/Small EPC 1028, and a small cell radio base station's LTE TDD 1030—one skilled in the art will readily recognize this architecture. As described above, the new small cell backhauling network 402 includes the small cell radio base station 410*a* (modeled as a LTE Non-IMT/3GGP UE to the 3GPP core network 1006), the small cell hub 412, the small cell backhaul controller 414, and the small cell backhaul storage unit 416.

The following is a discussion about one way that an operator can deploy the small cell backhauling network 402:

1. The operator deploys small cell radio base stations 410*a* and 410*b*. The small cell radio base stations 410*a* and 410*b* are connected via NLOS or other wireless connections 421 to the small cell hub 412 which is connected to the small cell backhaul controller 414 which connects the small cell radio base stations 410*a* and 410*b* to the 3GPP Core 404.
2. The operator establishes the fixed, or other, connections between the small cell hub 412, the small cell backhaul controller 414 and the 3GPP Core 404. This can be done via e.g. OSS 424's connectivity management.
3. The NLOS wireless connections 420 from the small cell radio base stations 410*a* and 410*b* to the small cell hub 412 are established by respectively emulating the 3GPP roles of UE and RBS.
4. In order to support this, the small cell backhaul controller 414 emulates a 3GPP core, herein after also referred to as 3GPP-PRIM, short-hand for "3GPP Core prim" (i.e. a second logical 3GPP core used for the sole purpose of controlling the backhaul links 420). The small cell backhaul controller 414 is logically distinct from the normal 3GPP Core 404 deployed to implement mobile broadband services for regular end-users.
5. The small cell radio base stations 410*a* and 410*b* each implement which is referred herein as a UE-PRIM role. Recall: the small radio base stations 410*a* and 410*b* are emulated as 3GPP UEs from the perspective of the 3GPP core 404.
6. The small cell hub 412 implements a RBS-PRIM role. Recall: the small cell hub 412 is emulated as regular 3GPP RBSs from the perspective of the 3GPP core 404.
7. The NLOS wireless connections 420 used need not necessarily be IMT bands, e.g. they could be in bands above 10 GHz or other frequencies.
8. Alternatively, fixed links 420 could also be integrated or used between the small cell radio base stations 410*a* and 410*b* and the small cell hub 412 via IMS technologies.
9. The small cell backhauling links 420 can be activated in the same manner as any normal 3GPP wireless service in RAN/radio air interface, using 3GPP-PRIM 414. The 3GPP-PRIM 414 is logically distinct from the 3GPP core 404. The 3GPP-PRIM 414 is used to implement small cell backhauling links 420. The 3GPP core 404 is used to implement mobile (broadband) services provided by the small cell radio base stations 410*a* and 410*b* to the 3GPP terminals 408*a* and 408*b*.

10. The 3GPP-PRIM 414 can be implemented as a subset, or other, or 3GPP Core, e.g. as MVNO. This MVNO can be internal or external.
11. The 3GPP-PRIM 414 can reuse the same mechanisms, functions and features as the 3GPP core 404. For example, USIM mechanisms and identities could be used to provision small cell backhaul links 420 in the system. The small cell storage unit 416 (related to HSS/HLR) could be used to define the links 420 and their QoS and other properties. Plus, the OSS system 424 could be reused to add security, service assurance and security to the small cell backhaul links 420.
12. The 3GPP-PRIM 414 is connected to the 3GPP core 404 typically by means of management systems. Therefore, the 3GPP-PRIM 414 acts as a form of control and sometimes traffic aggregator for small cell backhauling links 420.
13. When the 3GPP-PRIM 414 and associated entities namely the small cell radio base stations 410a and 410b and the small cell hub 412 have cooperatively established the small cell backhauling links 420, then they can also ensure that the small cell radio base stations 410a and 410b served by the small cell backhauling links 420 can reach the 3GPP core 404.
14. The 3GPP-PRIM 414 can operate transparently to the 3GPP core 404's entities.

In view of the foregoing, one should appreciate that an important feature of the present invention is that the small cell backhaul network 402 emulates, towards the 3GPP core 404, the point-to-multipoint wireless link 420 (for example) as a LTE radio bearer even though the point-to-multipoint wireless link 402 is actually implemented using a radio technology that is not part of the LTE/3GPP standard. Since, the proposed solution emulates an RBS-UE point-to-multipoint relationship from a backhauling perspective, the 3GPP core network mechanisms used to control the backhauling links established can be applied by the small cell hub 412 over e.g. point-to-multipoint radio as well as point-to-point radio or any combination thereof. As described above, the small cell wireless link(s) 420 can be NLOS and point-to-multipoint, e.g. over non-IMT bands, since this is where the advantages of the proposed approach reaps its greatest benefits. Furthermore, one should appreciate that the present invention fully leverages the fact that the emulated 3GPP link for backhaul (LTE-over-non-IMT) can be modeled and treated as a 3GPP link. In particular, the present invention presents the small cell backhaul controller 414 which manages these point-to-multipoint wireless links 420 as a logically and physically separate 3GPP Core which forms part of the MBH segment implementing the last wireless hop leading to the small cell radio base stations 410a and 410b. The small cell backhaul controller 414's main purpose is to control these hops. The small cell backhaul network 402 has numerous advantages such as (for example):

In most projections of small cell backhauling solutions, there will be an abundance of small cell links to manage. If one treats these small cell links as traditional e.g. microwave links, this will not scale well, since it will require advanced OSS/network management solutions to handle the abundant and dynamic small cell links. The only technology that has proven its ability to manage large numbers of wireless connections is 3GPP itself, and therefore the small cell backhaul network 402 has been configured to effectively "reuse" 3GPP technology to manage these abundant and dynamic small cell links.

The small cell backhaul network 402 can effectively "reuse" 3GPP tools to support wireless small cell backhauling beyond LTE relaying. As an example, the small cell backhaul network 402 can "reuse" 3GPP core and OSS solutions without changing their inner workings because the point-to-multipoint wireless links 420 are treated-emulated as any normal 3GPP UE link. As such, the small cell backhaul network 402 can "reuse" 3GPP tools such a HLR/HSS, MME, SGw, multi-activation, performance management tools, revenue assurance tools etc. . . . to monitor the small cell backhaul links 420.

The small cell backhaul network 402 enables new business models to thrive by "reusing" 3GPP technology, e.g. by implementing the small cell backhaul control and management in the same or similar manner as supporting a MVNO (Mobile Virtual Network Operator). For instance, an operator does not need to develop or purchase a new complex system to support their small cell backhauling solution, but instead can implement the small cell backhaul network 402 as a virtual solution in existing 3GPP systems. Hence, an operator can act as retailers for other operators' small cell backhauling solutions but without changing the competence they need to implement this new business opportunity made possible by the small cell backhaul network 402.

The small cell backhaul network 402 emulates non-3GPP point-to-multipoint small cell backhauling links 420, as 3GPP bearers, so that they can be handled by the RAN and core as 3GPP resources.

The small cell backhaul network 402 employs RAN-side NAS and S1 interfaces, through proxy units, to emulate non-3GPP point-to-multipoint small cell backhauling links 420 as 3GPP radio bearers so that they can be handled by RAN and core as 3GPP resources.

The small cell backhaul network 402 emulates NLOS wireless small cell backhauling links 420 as 3GPP bearers so that they can be handled by RAN and core as 3GPP resources.

The small cell backhaul network 402 emulates 3GPP UE and RBS roles over a wireless link or other to enable the full or partial use of 3GPP facilities to control small cell backhauling links 420.

The small cell backhaul network 402 effectively segments the backhaul solution into two structures, both instrumented by means of logically distinct 3GPP solutions. First, the small cell backhaul is managed as if it were a regular 3GPP network, establishing connections between the UE-role assumed by the small cell radio base stations 410a and 410b for the sake of backhauling, and a RBS/relay role assumed by the small cell hub 412 for the sake of small cell backhauling. Second, the "regular" backhaul which connects the aforementioned small cell hub 412 with the 3GPP core devices. The small cell hub 412 acts in the demarcation point between small cell and the 3GPP network.

The small cell backhaul network 402 can if desired effectively combine the small cell storage unit 416 and the 3GPP's HSS/HLR into one main storage unit and then use smart naming conventions of e.g. USIM and other identities to model the small cell backhauling links, so that a system can act differently on the represented entities in a logical way that enables an orderly establishment of small cell links before establishment of 3GPP connectivity served by these small cell links. For instance:

The main storage unit can contain both regular subscriber data records, as well as small cell link data records. These are treated in an identical fashion, but a higher order provisioning (HOP) system will be able to distinguish one entity type from another by means of different numbering schemes. In particular, the HOP will be able to deduce, from the scheme, if a HSS/HLR "UE" is actually a real UE or a small cell backhaul link.

The order in which the modeled UEs are treated can vary depending on what type of "UE" it represents (real UE or small cell backhaul UE).

Different numbering schemes can also be used to establish more complex scenarios, e.g. hierarchies of 3GPP based solutions. This could enable a system to e.g. first establish the innermost small cell links, and then repeat this towards the outermost links, so that all small cells get connected to the 3GPP core that serves all real end-user UEs.

The small cell hub-and-spoke topology can be extended in such a way that one spoke acts as a relay for another spoke farther from the to hub. This can be achieved by reusing standard LTE relaying methods.

Although multiple embodiments of the present invention have been illustrated in the accompanying Drawings and described in the foregoing Detailed Description, it should be understood that the invention is not limited to the disclosed embodiments, but instead is also capable of numerous rearrangements, modifications and substitutions without departing from the present invention that as has been set forth and defined within the following claims.

The invention claimed is:

1. A small cell backhaul network configured to interact with a 3rd Generation Partnership Project (3GPP) core and further configured to enable mobile broadband services to be provided by the 3GPP core to a plurality of 3GPP mobile terminals, the small cell backhaul network comprising:
   a plurality of small cell radio base stations, each small cell radio base station is linked to at least a portion of the plurality of 3GPP mobile terminals;
   a small cell hub which provides at least one wireless link to the plurality of small cell radio base stations;
   a small cell backhaul controller which controls the at least one wireless link between the small cell hub and the plurality of small cell radio base stations, where the small cell backhaul controller interacts with both the small cell hub and the 3GPP core;
   a small cell backhaul storage unit, coupled to the small cell backhaul controller, where the small cell backhaul storage unit maintains data pertaining to the at least one wireless link between the small cell hub and the plurality of small cell radio base stations, where the at least one wireless link is emulated as 3GPP radio bearers as seen from the 3GPP core irrespective of a radio technology actually used to implement the at least one wireless link; and
   wherein the small cell backhaul network further comprises:
      a first Mobile Backhaul (MBH) connection between the 3GPP core and the small cell backhaul controller;
      a second Mobile Backhaul (MBH) connection between the small cell backhaul controller and the small cell radio base stations;
      emulated 3GPP bearers between the small cell backhaul controller and the small cell radio base stations; and,
      emulated 3GPP radio bearers between the small cell hub and the small cell radio base stations.

2. The small cell backhaul network of claim 1, wherein each small cell radio base station provides coverage for a small cell that has an area which is smaller than a macro 3GPP cell, where the macro 3GPP cell covers an area that overlaps a plurality of the small cells.

3. The small cell backhaul network of claim 1, wherein each small cell radio base station is emulated as a legacy user equipment as seen from the 3GPP core.

4. The small cell backhaul network of claim 1, wherein the at least one wireless link over an air interface is implemented as a point-to-multipoint wireless link, at least one point-to-point wireless link, a combination of point-to-multipoint wireless link and least one point-to-point wireless link, a Non/Near Line of Sight (NLOS) in Non-international Mobile Telecommunication (IMT) bands, or a WiFi but emulated as a point-to-multipoint wireless link as seen from the 3GPP core.

5. The small cell backhaul network of claim 1, wherein the at least one wireless link is emulated as a point-to-multipoint wireless link as seen from the 3GPP core.

6. The small cell backhaul network of claim 1, wherein the small cell hub is emulated as a legacy radio base station as seen from the 3GPP core.

7. The small cell backhaul network of claim 1, wherein the small cell hub comprises a Non-Access Stratum (NAS) bridge which hides from the plurality of small cell radio base stations at least a portion of NAS signaling which is originated from the small cell backhaul controller.

8. The small cell backhaul network of claim 7, wherein the NAS bridge emulates a NAS User Equipment (UE) entity towards the small cell backhaul controller.

9. The small cell backhaul network of claim 7, wherein the NAS bridge is configured to originate and terminate NAS Protocol Data Unit (PDU) Information Elements (IEs).

10. The small cell backhaul network of claim 1, wherein the small cell backhaul controller contains a control plane entity and a data plane entity.

11. The small cell backhaul network of claim 1, wherein the small cell backhaul controller employs standard S1 Application Protocol (S1AP) in control plane interactions with the small cell hub.

12. The small cell backhaul network of claim 1, wherein the small cell backhaul controller employs standard Non-Access Stratum (NAS) signaling to interact with the small cell hub.

13. The small cell backhaul network of claim 1, wherein the small cell backhaul controller is implemented as a Mobile Virtual Network Operator (MVNO) entity in the 3GPP core.

14. The small cell backhaul network of claim 1, wherein the small cell backhaul storage unit is combined with a storage unit associated with the 3GPP core.

15. The small cell backhaul network of claim 1, wherein:
   the small cell radio base station comprises:
      a user plane protocol stack including an Internet Protocol (IP) layer, a Packet Data Convergence Protocol (PDCP) layer, a Radio Link Control (RLC) layer, a Medium Access Control (MAC) layer, and a Physical layer; and
      a control plane protocol stack including a NAS layer, a Radio Resource Control (RRC) layer, a PDCP layer, a RLC layer, a MAC layer, and a Physical layer;
   the small cell hub comprises:
      a user plane protocol stack has a portion which interfaces with the small cell radio base station and comprises a PDCP layer, a RLC layer, a MAC layer, and a Physical layer;
      the user plane protocol stack has another portion which interfaces with the small cell backhaul controller which comprises a GPRS Tunneling Protocol (GTP)

layer, a User Datagram Protocol (UDP) layer, an Internet Protocol (IP) layer, a L2 layer, and a L1 layer;
a control plane protocol stack has a portion which interfaces with the small cell radio base station and comprises a Non-Access Stratum (NAS) proxy layer, a RRC layer, a PDCP layer, a RLC layer, a MAC layer, and a Physical layer;
the control plane protocol stack has another portion which interfaces with the small cell backhaul controller and comprises a S1 Application Protocol (S1AP) layer, a Steam Control Transmission Protocol (SCTP) layer, an IP layer, a L2 layer, and a L1 layer;
the small cell backhaul controller comprises:
a user plane protocol stack which interfaces with the small cell hub and comprises a first IP layer, a GTP layer, a UDP layer, a second IP layer, a L2 layer, and a L1 layer; and
a control plane protocol stack which interfaces with the small cell hub and comprises a NAS layer, a S1 AP layer, a SCTP layer, an IP layer, a L2 layer, and a L1 layer.

16. A small cell backhaul network configured to interact with a 3rd Generation Partnership Project (3GPP) core and further configured to enable mobile broadband services to be provided by the 3GPP core to a plurality of 3GPP mobile terminals, the small cell backhaul network comprising:
a plurality of small cell radio base stations, each small cell radio base station is linked to at least a portion of the plurality of 3GPP mobile terminals;
a small cell hub which provides at least one wireless link to the plurality of small cell radio base stations;
a small cell backhaul controller which controls the at least one wireless link between the small cell hub and the plurality of small cell radio base stations, where the small cell backhaul controller interacts with both the small cell hub and the 3GPP core; and,
a small cell backhaul storage unit, coupled to the small cell backhaul controller, where the small cell backhaul storage unit maintains data pertaining to the at least one wireless link between the small cell hub and the plurality of small cell radio base stations, where the at least one wireless link is emulated as 3GPP radio bearers as seen from the 3GPP core irrespective of a radio technology actually used to implement the at least one wireless link; and,
wherein the small cell hub comprises a Non-Access Stratum (NAS) bridge which hides from the plurality of small cell radio base stations at least a portion of NAS signaling which is originated from the small cell backhaul controller.

17. The small cell backhaul network of claim 16, wherein the NAS bridge emulates a NAS User Equipment (UE) entity towards the small cell backhaul controller.

18. The small cell backhaul network of claim 16, wherein the NAS bridge is configured to originate and terminate NAS Protocol Data Unit (PDU) Information Elements (IEs).

19. A small cell backhaul network configured to interact with a 3rd Generation Partnership Project (3GPP) core and further configured to enable mobile broadband services to be provided by the 3GPP core to a plurality of 3GPP mobile terminals, the small cell backhaul network comprising:
a plurality of small cell radio base stations, each small cell radio base station is linked to at least a portion of the plurality of 3GPP mobile terminals;
a small cell hub which provides at least one wireless link to the plurality of small cell radio base stations;
a small cell backhaul controller which controls the at least one wireless link between the small cell hub and the plurality of small cell radio base stations, where the small cell backhaul controller interacts with both the small cell hub and the 3GPP core; and,
a small cell backhaul storage unit, coupled to the small cell backhaul controller, where the small cell backhaul storage unit maintains data pertaining to the at least one wireless link between the small cell hub and the plurality of small cell radio base stations, where the at least one wireless link is emulated as 3GPP radio bearers as seen from the 3GPP core irrespective of a radio technology actually used to implement the at least one wireless link; and,
wherein:
the small cell radio base station comprises:
a user plane protocol stack including an Internet Protocol (IP) layer, a Packet Data Convergence Protocol (PDCP) layer, a Radio Link Control (RLC) layer, a Medium Access Control (MAC) layer, and a Physical layer; and
a control plane protocol stack including a NAS layer, a Radio Resource Control (RRC) layer, a PDCP layer, a RLC layer, a MAC layer, and a Physical layer;
the small cell hub comprises:
a user plane protocol stack has a portion which interfaces with the small cell radio base station and comprises a PDCP layer, a RLC layer, a MAC layer, and a Physical layer;
the user plane protocol stack has another portion which interfaces with the small cell backhaul controller which comprises a GPRS Tunneling Protocol (GTP) layer, a User Datagram Protocol (UDP) layer, an Internet Protocol (IP) layer, a L2 layer, and a L1 layer;
a control plane protocol stack has a portion which interfaces with the small cell radio base station and comprises a Non-Access Stratum (NAS) proxy layer, a RRC layer, a PDCP layer, a RLC layer, a MAC layer, and a Physical layer;
the control plane protocol stack has another portion which interfaces with the small cell backhaul controller and comprises a S1 Application Protocol (S1AP) layer, a Steam Control Transmission Protocol (SCTP) layer, an IP layer, a L2 layer, and a L1 layer;
the small cell backhaul controller comprises:
a user plane protocol stack which interfaces with the small cell hub and comprises a first IP layer, a GTP layer, a UDP layer, a second IP layer, a L2 layer, and a L1 layer; and
a control plane protocol stack which interfaces with the small cell hub and comprises a NAS layer, a S1 AP layer, a SCTP layer, an IP layer, a L2 layer, and a L1 layer.

* * * * *

UNITED STATES PATENT AND TRADEMARK OFFICE
CERTIFICATE OF CORRECTION

PATENT NO.         : 9,232,557 B2
APPLICATION NO.    : 13/739085
DATED              : January 5, 2016
INVENTOR(S)        : Laraqui et al.

Page 1 of 1

It is certified that error appears in the above-identified patent and that said Letters Patent is hereby corrected as shown below:

Specification

In Column 4, Line 62, delete "one to" and insert -- one --, therefor.

In Column 7, Line 20, delete "4100a" and insert -- 410a --, therefor.

In Column 9, Line 50, delete "the 1 to" and insert -- the --, therefor.

In Column 10, Line 47, delete "IUE" and insert -- UE --, therefor.

In Column 13, Line 32, delete "link 402" and insert -- link 420 --, therefor.

In Column 15, Line 18, delete "the to" and insert -- the --, therefor.

Claims

In Column 17, Line 19, in Claim 15, delete "S1 AP" and insert -- S1AP --, therefor.

In Column 18, Line 58, in Claim 19, delete "S1 AP" and insert -- S1AP --, therefor.

Signed and Sealed this
Nineteenth Day of July, 2016

Michelle K. Lee
*Director of the United States Patent and Trademark Office*